June 26, 1962

T. A. HENSHAW 3,040,758

INDUCTORS FOR LIQUIDS

Filed July 16, 1959

5 Sheets-Sheet 1

Inventor
THOMAS ANTHONY HENSHAW

By
Larson and Taylor
Attorney

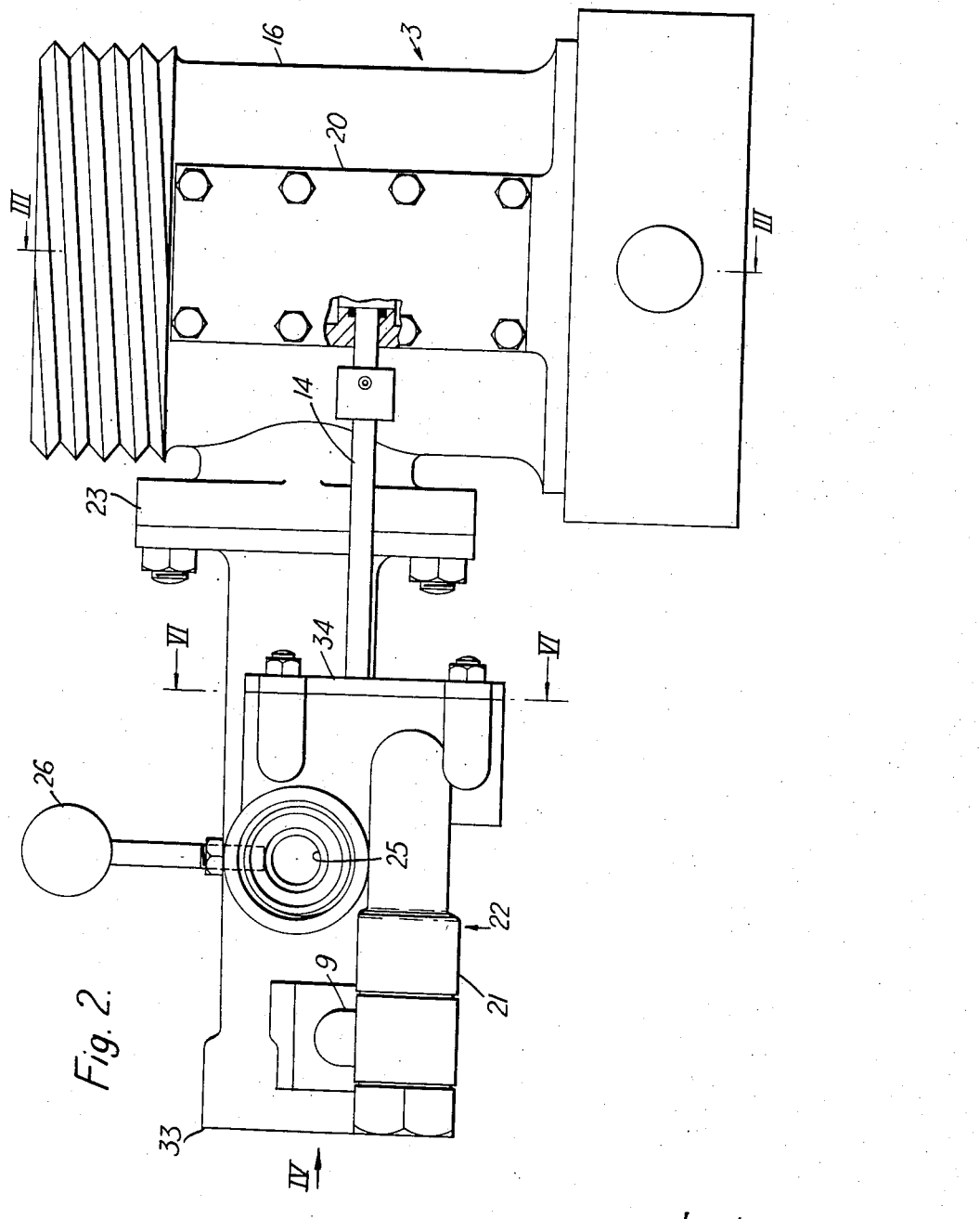

June 26, 1962  T. A. HENSHAW  3,040,758
INDUCTORS FOR LIQUIDS
Filed July 16, 1959  5 Sheets-Sheet 3

Inventor
THOMAS ANTHONY HENSHAW
By
Lawson and Taylor
Attorney

June 26, 1962 T. A. HENSHAW 3,040,758
INDUCTORS FOR LIQUIDS
Filed July 16, 1959 5 Sheets-Sheet 4

Inventor
THOMAS ANTHONY HENSHAW
By
Attorney

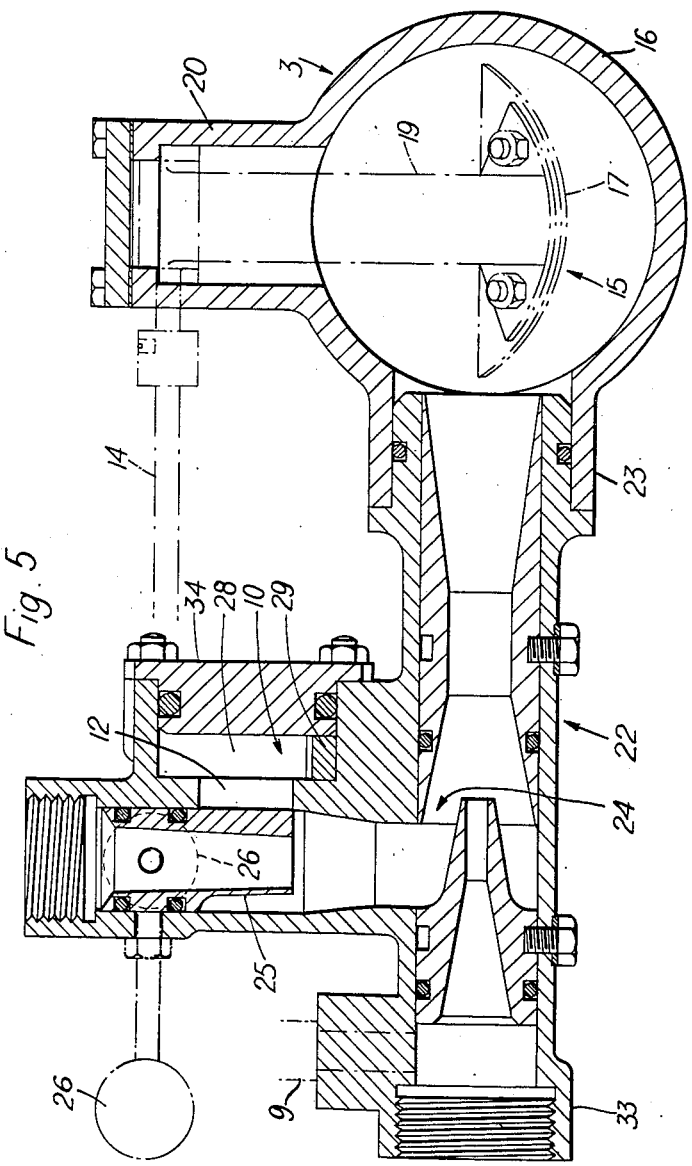

United States Patent Office 3,040,758
Patented June 26, 1962

3,040,758
INDUCTORS FOR LIQUIDS
Thomas Anthony Henshaw, Richmond, England, assignor to The Pyrene Company Limited
Filed July 16, 1959, Ser. No. 827,548
Claims priority, application Great Britain July 21, 1958
5 Claims. (Cl. 137—9)

In the production of foam for fire-extinguishing purposes it is common to induce a concentrated foam-stabilizing solution into a flowing stream of water by venturi action. The output of foam may have to be varied, e.g. because the number of delivery nozzles in use may be changed, but a predetermined ratio of foam-stabilizing solution to water should be maintained, as the quality of the foam produced is dependent upon it.

The main object of this invention is to maintain this ratio substantially constant automatically. Another object is to provide an improved apparatus for the production of fire-extinguishing foam.

More specifically, the invention relates to apparatus comprising a source of foam-stabilizing compound, an inductors of the venturi type with its low-pressure point directly connected to a source of supply of foam-stabilizing compound, a pipe through which a main stream of water flows and into which the stream delivered by the inductor flows, and a pipe supplying water to the inductor. Broadly stated in apparatus of this kind according to the invention, there are passage-forming means through which water can flow to the low-pressure point of the inductor and means by which the rate of flow of water through these passage-forming means are so related to the rate of flow of the main stream that one of these rates decreases as the other increases. In effect, the suction of the inductor is satisfied to a greater or less extent by the water admitted through the passage-forming means, and accordingly less or more foam-stabilizing compound is induced.

Figure 1:
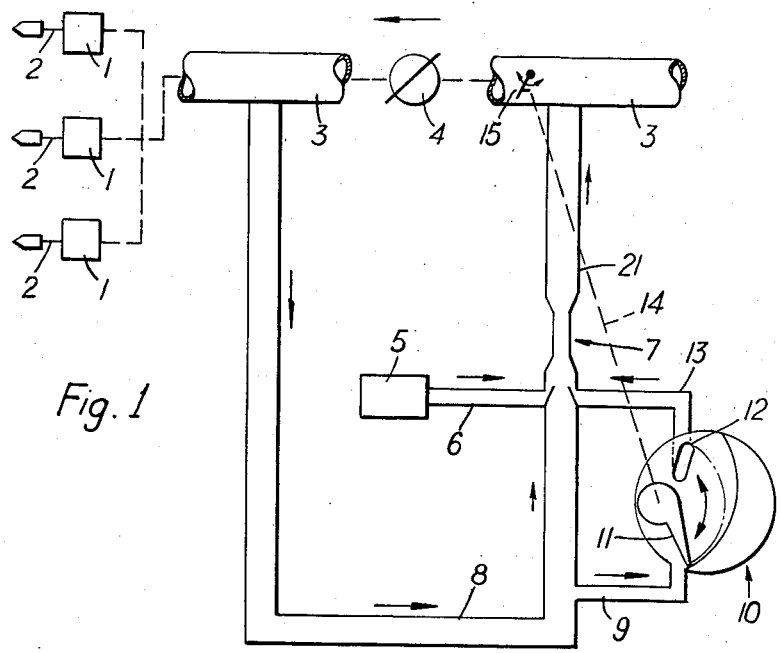
Figure 8:
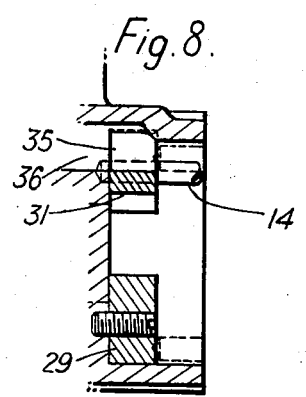
Figure 7:
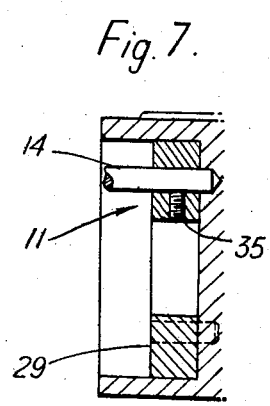
Figure 3:
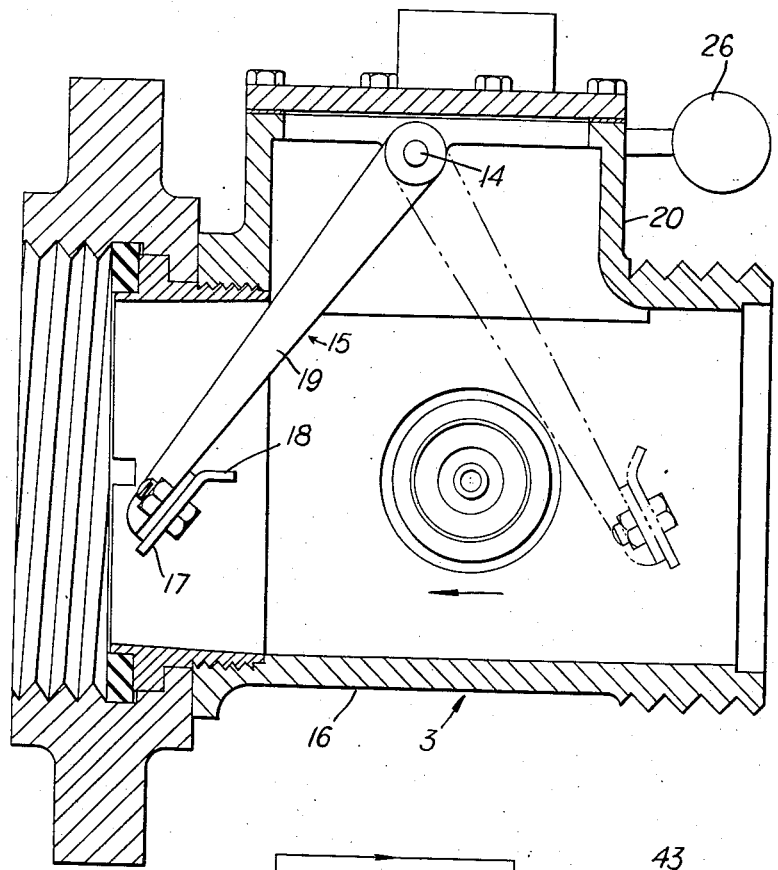
Figure 9:
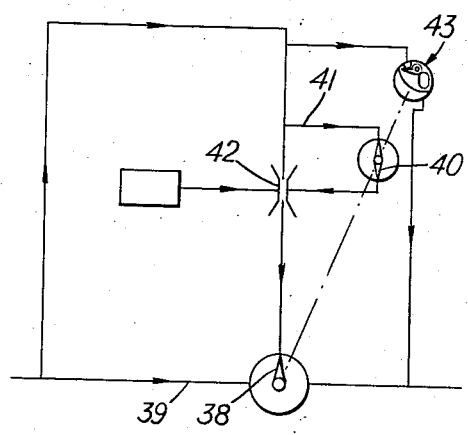
Figure 4:
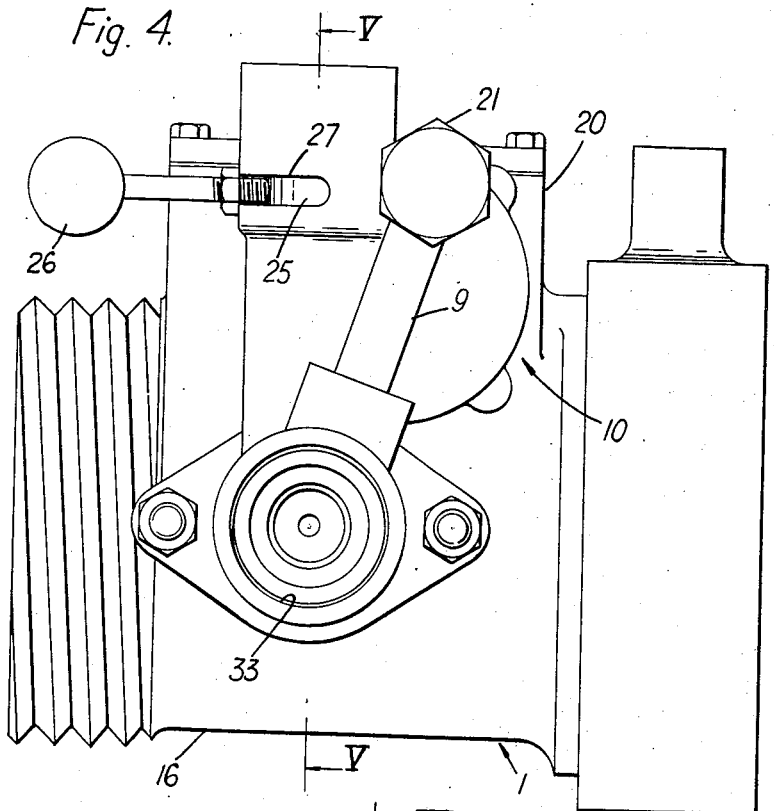
Figure 6:
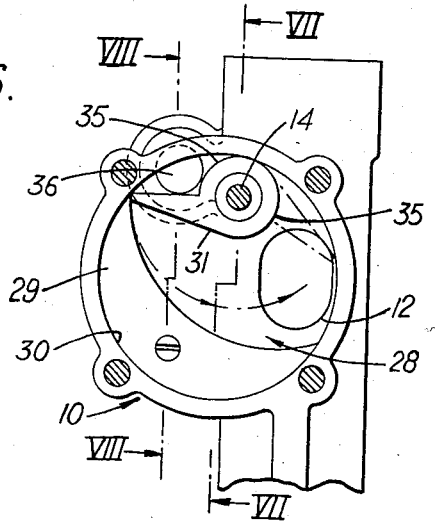

The invention will be more clearly understood by reference to the accompanying drawings, in which:

FIGURE 1 is a diagram illustrating the principle of operation;
FIGURE 2 is a plan of the preferred construction;
FIGURE 3 is a section on the line III—III in FIGURE 2;
FIGURE 4 is an end elevation taken in the direction of the arrow IV in FIGURE 2;
FIGURE 5 is a section on the line V—V in FIGURE 4;
FIGURE 6 is a section on the line VI—VI in FIGURE 2;
FIGURES 7 and 8 are sections on the lines VII—VII and VIII—VIII respectively in FIGURE 6; and
FIGURE 9 is a diagram showing a modification.

The complete apparatus is shown diagrammatically in FIGURE 1. It comprises three foam generators 1 which deliver foam through pipes 2, and which for this purpose must be provided with streams of a dilute solution of foam-stabilizing compound in water. This solution is supplied through a main pipe 3 in which a pump 4 is situated. Concentrated foam-stabilizing compound is kept in a tank 5 connected by a pipe 6 to the low-pressure point of an inductor 7. This inductor is fed with water under pressure from the pipe 3 downstream of the pump 4 through a pipe 8, and discharges through a pipe 21 into the pipe 3 upstream of the pump 4. A pipe 9 branches from a pipe 8 to a flow regulator 10. This regulator comprises a chamber containing a vane 11 by which the passage for the flow of water can be varied, and is so constructed that the water entering through the pipe 9 tends to force the vane 11 to increase the passage available for the water to flow through the regulator to an outlet port 12. The port 12 leads through a pipe 13 to the low-pressure point of the inductor 7, so the greater the volume of water that is allowed to pass through the regulator, the greater the proportion of the suction set up in the inductor that is satisfied by this water and the less foam-stabilizing compound is drawn to the low-pressure point through the pipe 6. The vane 11 is rigidly mounted on a rocking spindle 14 which also rigidly carries a vane 15 situated upstream of the pump 4 in the main pipe 3. The vane 15 moves, rocking the spindle 14 under the flow of water in this main pipe, and the vane 11 is moved through the same angle by the spindle with the result that this vane tends increasingly to obstruct the flow of water through the regulator. Consequently the greater the extent of rocking of the vane 15 under the influence of the main water stream and therefore the greater the requirement for foam-stabilizing solution, the more is the vane 11 rocked to obstruct the passage of water through the regulator and thus to allow the requirements of the inductor 7 to be satisfied to an increasing extent by foam-stabilizing compound from the tank 5. As the vane 11 rocks in this way the force exerted on it by the water entering through the pipe 9 increases, and so the resistance of the vane to movement increases. At any given rate of flow of the main stream, therefore, there will be a position of equilibrium of the two vanes in which the torque set up by the thrust of the water in the main stream on the vane 15 balances that set up on the vane 11 by the water entering the regulator.

Referring now to FIGURES 2 to 7, the only part of the main pipe 3 shown is a tubular fitting 16 housing the vane 15. This vane consists of a segmental blade 17 with a lip 18 and it is carried on an arm 19 rigid with the spindle 14. The lip 18 on the upper edge of the vane 17 is parallel to the stream in the position of maximum displacement of the vane and provides a minimum effective area to the oncoming water in the pipe 3 when the flow is at a maximum and vice versa. The spindle 14 passes through the side wall of a housing 20 at the top of the fitting 16. The provision of this housing allows the arm 19 to be longer than if the whole of the vane including the arm had to be mounted within the circular part of the fitting 16, and in consequence adequate torque to operate the regulator 10 reliably is available without imposing too much obstruction to the main flow of water to the pump through the pipe 3.

The inductor 7 is part of an assembly 22 which includes the regulator and which is bolted as a whole onto a flange 23 on the fitting 16. The inductor itself is best shown in FIGURE 5. The assembly 22 includes a pipe connection 33 to which the pipe 8 (not shown in FIGURES 2 to 7) is led and from which the pipe 9 runs to the regulator 10. The low-pressure point of the inductor indicated at 24 is in communication both with the pipe 9 through a fitting 25 and with the port 12. The fitting 25 is an eccentrically machined tube which serves both as a passage for the foam-stabilizing compound and as an obturator for the port 12. By rotating the fitting 25 about its axis the extent to which flow can take place through the port 12 in any event is variable. The adjustment of the fitting 25 is effected through a handle 26 which can turn in a horizontal plane through a slot 27 in the casing of the assembly 22.

The regulator is shown in detail in FIGURES 6 to 8. It comprises a lenticular chamber 28 made by inserting a crescent-shaped insert 29 into a cylindrical chamber 30 which forms part of the assembly 22. The spindle 14 passes through a removable cover 34 of this chamber and carries the vane 11, which consists of a circular part 35 making contact with the wall of the chamber 28 and a tongue 31 projecting forwards into contact with the same wall when the vane 11 is in the position in which it most completely obstructs the flow of water through the regulator. The pipe 9 which takes the water to the regulator extends upwards as shown in FIGURE 4 and enters a horizontal fitting 21 running along the top of the assembly 22 to terminate in an inlet port 36 of the chamber 28, so that the incoming water enters the space bounded as shown in FIGURE 6 by the upper edge of the tongue 31 and the left-hand edge of the circular part 35 of the vane 11. The incoming water tends to rock the vane anticlockwise as shown in FIGURE 6 so that it can flow to the port 12 in the manner indicated by arrows. As will be understood the vane is rocked clockwise through the spindle 14 by the vane 15.

In the apparatus shown, the inductor is fed with water from the main stream. Therefore as the rate of flow of the main stream changes, the vacuum produced by the inductor changes also. However, this change of vacuum is not in itself sufficient to ensure that the concentration of foam compound induced into the main stream remains constant. If desired the inductor may be fed with water from a constant-pressure source.

Various other modifications may be made. One is illustrated by FIGURE 9, and in it a semi-circular flap vane 38 in a main stream 39, a butterfly valve 40 in a by-pass 41 to the high-pressure side of a venturi 42, and a regulator vane 43 similar in construction and operation to the vane 11 are mounted on a common spindle not shown. In this construction the water that flows to the low-pressure region of the venturi in partial satisfaction of its suction comes from the by-pass 41, in which its passage is regulated by the butterfly valve to which the water flowing in the by-pass imparts no substantial torque. Water passing through the chamber of the regulator vane, which opposes the movement of the vane 38, is discharged into the main stream.

In another modification of the apparatus the regulator may be replaced by a simple valve. The vane in the main stream, the setting of which is related to that of the valve, is then spring-loaded or otherwise subjected to a restoring force by which it can be moved against the force of the main stream, since the valve, unlike the regulator, will not provide the necessary restoring force.

I claim:

1. Apparatus for proportioning the feed of a foam-stabilizing compound into a main stream of water comprising a main conduit carrying a main stream of water, a venturi type inductor, by-pass means for by-passing a portion of said main stream of water through the nozzle of said inductor, compound feed means for feeding a supply of foam-stabilizing compound to the low pressure intake of said inductor, water feed means for feeding a supply of water to the low pressure intake of said inductor and regulating means for regulating the rate of feed of water to said intake, said regulating means being actuated by the flow of water in said main conduit and being further actuated by the flow of water to said intake.

2. Apparatus according to claim 1 in which said regulating means comprises a movable vane disposed in said main conduit for actuation by the flow of said main stream, valve means disposed to control the rate of feed of water to said low pressure intake, and means for actuating said valve in response to movement of said vane.

3. Apparatus according to claim 2 in which said valve means comprises a variable flow control valve actuated by a pivoted actuator, and the said movable vane is pivotally mounted in said conduit and the said actuator and vane are both mounted on a common spindle for operating the actuator by movement of the vane.

4. Apparatus according to claim 3 wherein the said vane and actuator are co-operatively adapted to progressively constrict the valve as the flow rate in the main conduit increases and to progressively open the valve as said flow rate decreases.

5. A method for proportioning the feed of foam-stabilizing compound into a main stream of water comprising by-passing a portion of the main stream of water from a high pressure point in the stream and back to the stream at a lower pressure point in the stream, utilizing said by-passed stream to create a region of low pressure in said by-passed stream, and utilizing said low pressure region to induce a flow of foam-stabilizing compound and water into said by-passed stream and varying the ratio of said induced flow of water to foam-stabilizing compound inversely as the velocity of the main stream varies.

References Cited in the file of this patent

UNITED STATES PATENTS

| | | |
|---|---|---|
| 2,164,153 | Friedrich | June 27, 1939 |
| 2,198,585 | Urquhart | Apr. 23, 1940 |
| 2,274,029 | Archer | Feb. 24, 1942 |
| 2,611,439 | Faulkner | Sept. 23, 1952 |
| 2,664,909 | Brock | Jan. 5, 1954 |
| 2,769,500 | Clifford | Nov. 6, 1956 |

FOREIGN PATENTS

| | | |
|---|---|---|
| 896,302 | Germany | Nov. 12, 1953 |